Figure 1:
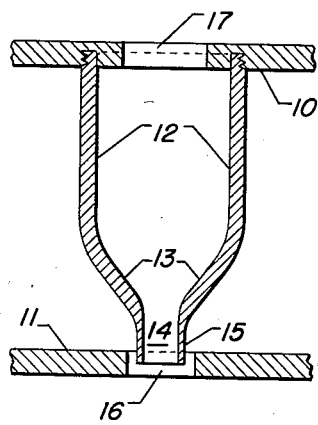

Feb. 27, 1962  M. A. SMITH  3,023,171
APPARATUS FOR THE MANUFACTURE OF SPHERICAL PARTICLES
Filed Aug. 13, 1959

INVENTOR:
Marvin A. Smith
BY,
Chester J. Giuliani
Philip F. Liggett
ATTORNEYS

United States Patent Office 3,023,171
Patented Feb. 27, 1962

3,023,171
APPARATUS FOR THE MANUFACTURE OF
SPHERICAL PARTICLES
Marvin Albert Smith, Shreveport, La., assignor to Universal Oil Products Company, Des Plaines, Ill., a corporation of Delaware
Filed Aug. 13, 1959, Ser. No. 833,454
6 Claims. (Cl. 252—359)

The present invention relates to the manufacture of spherical particles, and is specifically directed to a novel apparatus and the method of utilizing the same in processes wherein the material to be shaped into spheres, existing in a fluid state, is dispersed as droplets into a suitable gelling medium. Particular benefits are afforded those processes which utilize superatmospheric pressures during the formation of spheroidal particles.

Many instances, presently being utilized for a multitude of purposes, and manufactured in a wide variety of commercial industries, take the form of spheroids or substantially spherical particles. The advantages of spherically shaped particles are obvious and well-known, and are rather thoroughly described in the prior art relating thereto. Regardless of the particular industry, process or specific method of manufacture, the spherical particles are generally formed from a fluid state of the particular material, such as, from a liquid, a hydrosol, or, in the case of metallic substances, from the molten metal, etc. The particular method generally involves dispersing the fluid, in the form of droplets, into a suitable gelling medium; the droplets gradually take on a substantially spherical shape while traversing therethrough. Various processes utilize different liquids, or gelling media, into which the substance, desired to exist ultimately in the form of spherical particles, is dispersed or dropped. These liquids are dependent upon the individual characteristics of the process and method, the material to be formed into spheres, the desired physical properties to be imparted to the final product, etc. Various gelling agents are employed, and include water, aqueous solutions of various salts, hydrogenated oils of different consistencies, glycols, etc. The utilization of any particular gelling agent, in any given process which involves the formation of substantially spherical particles, is not essential to the method of the present invention; as hereinabove set forth, the present invention relates to a particular apparatus for use in such processes, and is concerned primarily with the utilization of such apparatus in a particular manner.

Although the apparatus of the present invention may be employed to advantage in many industries and in a variety of processes, among which are the pharmaceutical, for the production of drugs and vitamins; the petroleum for the manufacture of catalysts and carriers thereof, etc.; in the interest of simplicity, the following discussion will be restricted to a single process in a particular industry. It is understood that this restriction is for the sole purpose of illustration and definiteness, and is not intended to limit unduly the present invention beyond the scope and spirit of the appended claims. It is further understood that the use of the apparatus, as hereinafter described, is not meant to be limited to the particular embodiments set forth; other methods of employing the apparatus, and insignificant modifications thereof, will be readily ascertained by those skilled in the art.

The petroleum and chemical industries depend to an indeterminable extent upon the effective promotion of a multitude of chemical reactions, or a particular reaction from a select group of reactions, and employ many various catalytic materials in the furtherance thereof. Usually, the catalytically active components of the catalysts are composited with a suitable refractory inorganic oxide carrier material, and the finished catalyst generally takes the form of spheres. The refractory oxides most frequently employed are selected from the group consisting of alumina, silica, zirconia, thoria, mixtures thereof, etc. There are many advantages to the utilization of the refractory material in spheroidal form, and, in the manufacture of such spherical particles, a hydrous inorganic oxide sol, such as an alumina hydrosol, is generally prepared. The sol is subsequently dispersed, in the form of droplets, into a suitable gelling medium in which the droplets assume a spherical shape, and, while traversing through said gelling medium, become set into semi-solid hydrogel spheroids. The semi-solid spheroids are subsequently subjected to one or more specific aging treatments for the purpose of imparting certain desired physical characteristics thereto. It has recently been found to be of advantage to effect the various aging treatments at superatmospheric pressures, and to combine the forming and aging process into a unitary process in which the forming and subsequent aging of the hydrogel spheroids may be readily effected continuously.

The present method, utilized for the production of refractory inorganic oxide spheres, employs a novel apparatus comprising a dropping head which supports a plurality of dropping tips, each of the latter exuding a stream of the hydrosol as droplets from above and into an oil bath. Under certain conditions of temperaure and pressure, the droplets take on a substantially spherical shape and gradually set into firm hydrogel spheroids within the oil bath. It is acknowledged that better operation is effected when the dropping head is suspended just above the oil level, and it is essential, to the formation of substantially uniform spheres, that the oil level does not come in contact with the lower extremity of the dropping tip. The control of the distance of suspension is especially critical to the operation, and becomes more critical when superatmospheric pressures are imposed upon the system. Of particular difficulty, with regard to the critical distance between the lower extremity of the dropping tip and the oil level, is the control of the level of the gelling medium so that it is always maintained out of contact with the lower extremity of the dropping tip, while maintaining the distance between the dropping tip and the level of the gelling medium constant. The apparatus of the present invention employs the same materials and equipment heretofore utilized, the substantial change being the modification of the dropping head and dropping tips, which modification is the subject of this invention.

In one embodiment, the present invention concerns a novel sphere-forming apparatus which comprises an upper horizontal plate, a lower horizontal plate, a dropping tip depending from said upper plate, the lower portion of said dropping tip being of circular cross-section, said lower portion terminating in a restricted outlet for droplets at its lower end and being co-axial with and extending partially into a large circular opening in said lower plate and forming an annular space between said dropping tip and the lower plate, an aperture through said upper plate above said dropping tip for supplying fluid material to be gelled to the interior of the dropping tip, and means for passing a gelling liquid downwardly through said annular space.

In another embodiment, the present invention relates to a sphere-forming dropping head which comprises in combination an upper horizontal plate, a lower horizontal plate, a dropping tip depending from said upper plate, the lower portion of said dropping tip being of circular cross-section, a conduit of greater diameter than the lower portion of said dropping tip extending through and upwardly from said lower plate, the lower portion of said dropping tip terminating in a restricted outlet for droplets at its lower end and being co-axial with and extending partially into said conduit and forming an annular space between the dropping tip and the conduit, an aperture through said upper plate above said dropping tip for supplying fluid material to be gelled to the interior of the dropping tip, and means for passing a gelling liquid downwardly through said annular space.

In a specific embodiment, the present invention provides a spherical particle-forming apparatus comprising a vertical sphere-forming chamber adapted to contain a gelling liquid in its lower portion, a first horizontal plate extending across the upper portion and spaced from the top of said chamber and forming a first reservoir with the top of the chamber, a second horizontal plate extending across the chamber and spaced beneath the first plate and forming a second reservoir, means for introducing to said first reservoir fluid material to be formed into spherical particles, a dropping tip depending from said first plate, the upper portion of said dropping tip being in communication with said reservoir through an opening in said first plate and the lower portion of said dropping tip being conical and terminating in a restricted outlet for droplets at its lower end, said lower portion being coaxial with and extending partially into a larger circular opening through said second plate and forming an annular space between said dropping tip and the second plate, means for circulating gelling liquid from said chamber below said second plate to said second reservoir and through said annular space, and means for removing gelled particles from the lower portion of the chamber.

Figure 3:
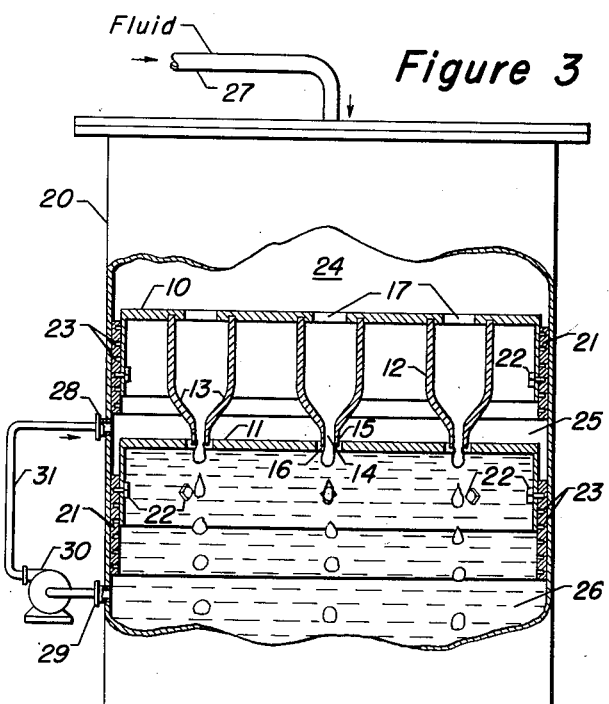
Figure 2:
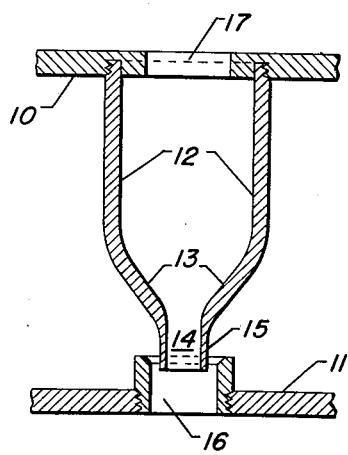
Figure 2:
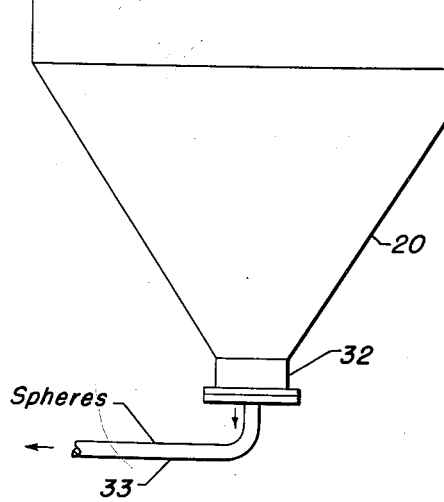

The apparatus of the present invention, and the method of utilizing the same, can best be described wtih reference to the accompanying drawings. FIGURES 1 and 2 therein are enlarged sectional elevation views of two particular forms in which the dropping tip may be designed; FIGURE 3 illustrates still another embodiment of the invention including its application to the process of forming spherical particles. It is understood that the broad scope of the present invention is not to be limited unduly to the particular embodiments illustrated; other embodiments, general refinements and insignificant modifications of the structures illustrated will become apparent to those skilled in the art.

In FIGURE 1, plate 10, having aperture 17, is the upper plate of a dropping head containing a plurality of dropping tips each of which comprise a shell or housing 12 which is in open communication, through plate 10 via aperture 17, with an upper reservoir above plate 10 containing the material to be formed into spherical particles. For simplicity, only on such dropping tip is shown here. In the particular embodiment illustrated, shell 12 has an enlarged upper portion and forms a conical section in its lower portion 13, which conical section terminates at the extremity thereof in a restricted opening or outlet 14, through which the material to be formed into spherical particles passes in the form of droplets. Although lower portion 13 may have shapes other than conical, for example, cylindrical, parabolic, hyperbolic, etc., it is essential that outlet 14 have a substantially reduced diameter approximating the diameter of the spherical particles to be formed. Regarding the overall shape of the dropping tip, it is desirable that the upper portion thereof be of enlarged cross-section while the lower portion be swedged down in a continuous curve and terminated in a restricted outlet 14 of the desired diameter. In particular, a dropping tip consisting of a conduit or capillary of uniform cross-section would be inoperable within the scope of this invention since the relatively high fluid velocities produced therein would result largely in the formation of non-spherical particles. A second plate 11 is spaced beneath plate 10 and is provided with a circular opening 16 which is slightly larger than the outside diameter of lower portion 13 of dropping tip 12. Dropping tip 12 extends partially into opening 16 and, outlet 14 being concentric therewith, an annular opening 15 results. One of the essential features of this invention is that dropping tip 12 does not extend completely through plate 11, i.e., outlet 14 must not be at a lower elevation than the undersurface of plate 11. Upper plate 10 and lower plate 11, together with the walls of the pressure vessel in which they are placed, form an intermediate reservoir containing oil (gelling liquid). The oil is caused to flow downwardly through annular space 15 into a sphere-forming zone beneath plate 11.

FIGURE 2 illustrates another arrangement of the dropping tip which is generally identical with the embodiment of FIGURE 1 except that opening 16 is in the form of an open-ended conduit or tube extending through and a short distance above plate 11. The dropping tip extends partially into the conduit but must not project beneath plate 11. The inner surface of conduit 16 may be conically beveled, if desired, to provide an annular zone 15 of decreasing cross-sectional area in the direction of fluid flow therethrough in order to increase the rate of oil flow around the lower extremity of shell 12. The embodiment of FIGURE 2 is especially desirable in that the size of annular opening 15 may be more easily adjusted without unnecessarily increasing the thickness of plate 11, as might be required with the simpler structure of FIGURE 1.

The cut-away sectional elevation view and flow diagram of FIGURE 3 illustrate a preferred embodiment of the apparatus and the method by which it is operated. Vertical vessel 20 comprises a sphere-forming tower within its upper portion and may also include an aging section within its lower portion. An upper horizontal plate 10 and a lower horizontal plate 11 both extend across the upper interior portion of vessel 20, dividing the latter into at least 3 zones numbered 24, 25 and 26. Uppermost zone 24 is a reservoir for fluid material to be formed into spheres, central zone 25 is a reservoir containing gelling medium, and lowermost zone 26 constitutes the sphere-forming section and may also conveniently form a sphere-aging section. Plates 10 and 11 may be circular, as shown, or chordal, square, rectangular, etc. A plurality of laterally spaced dropping tips 12 depend from plate 10, and the interior of each is in fluid communication with zone 24 through aperture 17 in plate 10. Lower plate 11 contains a plurality of circular holes 16 each of which is in axial alignment with, and partially overlaps, the restricted outlet 14 of a corresponding dropping tip 12. In order to accurately adjust the spacing between the dropping tips and plate 11, either or both of plates 10 and 11 may be adapted to be vertically adjustable. As illustrated, plates 10 and 11 are provided with downwardly extending sidewalls which bear in pressure-tight relationship against annular bearing members 21, the latter being affixed to the interior vertical wall of vessel 20. A series of vertically spaced, threaded bolt holes 23 is provided in bearing members 21 at spaced intervals around the circumference thereof, the bolt holes at any one elevation being co-planar with all other corresponding circumferential bolt holes. The sidewalls of plates 10 and 11 are secured to their respective bearing members by means of circuferentially spaced bolts 22. Either or both of the horizontal plates may be raised or lowered incrementally through selection of the desired bolt holes 23, thereby obtaining the optimum tip-plate spacing as determined by the characteristics of the fluids being handled. Of course, other suitable and equivalent means for vertically adjusting plates 10 and/or 11 may be provided, such as jack screws, multiple circular tracks disposed in and around the interior surface of vessel 20, etc.

The material to be formed into spherical particles is passed through line 27 into forming tower 20. As hereinbefore set forth, the forming tower may be conveniently combined with the aging vessel, or any other vessel necessary in the manufacture of the spherical particles, in which vessel the spherical particles are transported in a substantially vertical direction. The material entering forming tower 20 is contained in reservoir 24 from which it enters the dropping tips through apertures 17 provided in upper plate 10. The material passes in a downwardly direction, exuding from the lower extremity of the dropping tips indicated by restricted outlets 14. It should be noted that outlets 14 extend into and are surrounded by the particular gelling medium employed in forming zone 26. As indicated, the gelling medium in zone 26 is prevented from entering zone 25 by the imperforate portions of plate 11. Further, due to an imposed pressure on forming tower 20, or the differential head pressure when the process operates at atmospheric pressure, the gelling medium or oil is prevented from backing up into annular spaces 15 and contacting thereby the lower extremity of dropping tips 12. The forming tower is supplied with outlet 29 through which the gelling medium is circulated in line 31 via pump 30 into inlet 28. The void area 25 surrounding the dropping tips becomes, and remains, filled with the gelling medium entering via inlet 28. The gelling medium enters annular spaces 15 and is passed therethrough down and around the lower extremity of dropping tips 12, effecting thereby a positive sweeping or suction action which effectively pulls the droplets of fluid from restricted outlets 14 of dropping tips 12. The droplets pass through outlets 14 into the main body of gelling medium in zone 26, and ultimately are removed from forming tower 20 through line 33 at outlet 32.

From the foregoing discussion, it is readily ascertained that the apparatus of the present invention affords a distinct improvement to processes for the manufacture of spherical particles, and is of particular advantage when employed in those processes effected at superatmospheric pressure. Sensitive and intricate level control has been eliminated without the destruction of the purpose served thereby. Regardless of the precise location of the level within the upper portion of the forming tower, the gelling medium is maintained out of contact with the material to be formed into spherical particles until the same has left, or is about to be exuded from the dropping tips.

I claim as my invention:

1. A spherical particle-forming apparatus comprising a closed chamber, an upper horizontal plate and a lower horizontal plate within the chamber, a dropping tip depending from said upper plate, the lower portion of said dropping tip being of circular cross-section, said lower portion terminating in a restricted outlet for droplets at its lower end and being co-axial with and extending partially into but not completely through a larger circular opening in said lower plate and forming an annular space between said dropping tip and the lower plate, an aperture through said upper plate above said dropping tip for supplying fluid material to be gelled to the interior of the dropping tip, and means for passing a gelling liquid downwardly through said annular space.

2. A spherical particle-forming apparatus comprising a closed chamber, an upper horizontal plate and a lower horizontal plate within the chamber, a dropping tip depending from said upper plate, the lower portion of said dropping tip being of circular cross-section, a conduit of greater diameter than the lower portion of said dropping tip extending through and upwardly from said lower plate, the lower portion of said dropping tip terminating in a restricted outlet for droplets at its lower end and being co-axial with and extending partially into but not completely through said conduit and forming an annular space between the dropping tip and the conduit, an aperture through said upper plate above said dropping tip for supplying fluid material to be gelled to the interior of the dropping tip, and means for passing a gelling liquid downwardly through said annular space.

3. A spherical particle-forming apparatus comprising a closed chamber, an upper horizontal plate and a lower horizontal plate within the chamber, one of said plates being movable in a vertical direction whereby the spacing therebetween is adjustable, a dropping tip depending from said upper plate, the lower portion of said dropping tip being of circular cross-section, said lower portion terminating in a restricted outlet for droplets at its lower end and being co-axial with and extending partially into but not completely through a larger circular opening in said lower plate and forming an annular space between said dropping tip and the lower plate, an aperture through said upper plate above said dropping tip for supplying fluid material to be gelled to the interior of the dropping tip, and means for passing a gelling liquid downwardly through said annular space.

4. A spherical particle-forming apparatus comprising a closed chamber, an upper horizontal plate and a lower horizontal plate within the chamber, a dropping tip depending from said upper plate, the lower portion of said dropping tip being of conical shape and terminating in a restricted outlet for droplets at its lower end, said lower portion being co-axial with and extending partially into but not completely through a larger circular opening in said lower plate and forming an annular space between said dropping tip and the lower plate, an aperture through said upper plate above said dropping tip for supplying fluid material to be gelled to the interior of the dropping tip and means for passing a gelling liquid downwardly through said annular space.

5. A spherical particle-forming apparatus comprising a vertical sphere-forming chamber adapted to contain a gelling liquid in its lower portion, a first horizontal plate extending across the upper portion and spaced from the top of said chamber and forming a first reservoir with the top of the chamber, a second horizontal plate extending across the chamber and spaced beneath the first plate and forming a second reservoir, means for introducing to said first reservoir fluid material to be formed into spherical particles, a dropping tip depending from said first plate, the upper portion of said dropping tip being in communication with said first reservoir through an opening in said first plate and the lower portion of said dropping tip being conical and terminating in a restricted outlet for droplets at its lower end, said lower portion being co-axial with and extending partially into but not completely through a larger circular opening in said second plate and forming an annular space between said dropping tip and the second plate, means for circulating gelling liquid from said chamber below said second plate to said second reservoir and through said annular space, and means for removing gelled particles from the lower portion of the chamber.

6. A spherical particle-forming apparatus comprising a closed chamber, an upper horizontal plate and a lower horizontal plate within the chamber, a plurality of laterally spaced dropping tips depending from said upper plate, the lower portion of each of said dropping tips being of circular cross-section, said lower portion terminating in a restricted outlet for droplets at its lower end and being co-axial with and extending partially into but not completely through a larger circular opening in said lower plate and forming an annular space between the dropping tip and the lower plate, a plurality of apertures through said upper plate each above one of said dropping tips for supplying fluid material to be gelled to the interior of the dropping tip, and means for passing a gelling liquid downwardly through the resulting plurality of said annular spaces.

References Cited in the file of this patent

UNITED STATES PATENTS

| | | |
|---|---|---|
| 2,275,154 | Merrill et al. | Mar. 3, 1942 |
| 2,384,944 | Marisic | Sept. 18, 1945 |
| 2,616,857 | Shabaker | Nov. 4, 1952 |
| 2,902,455 | Fischer et al. | Sept. 1, 1959 |